Oct. 28, 1952
J. H. SHIPE
2,615,753
DUMP BODY STRUCTURE
Filed Nov. 18, 1947
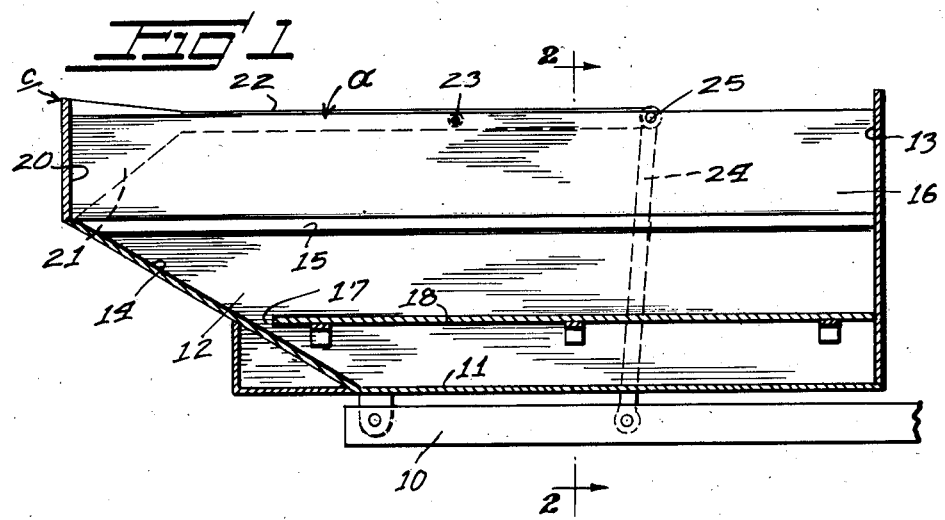
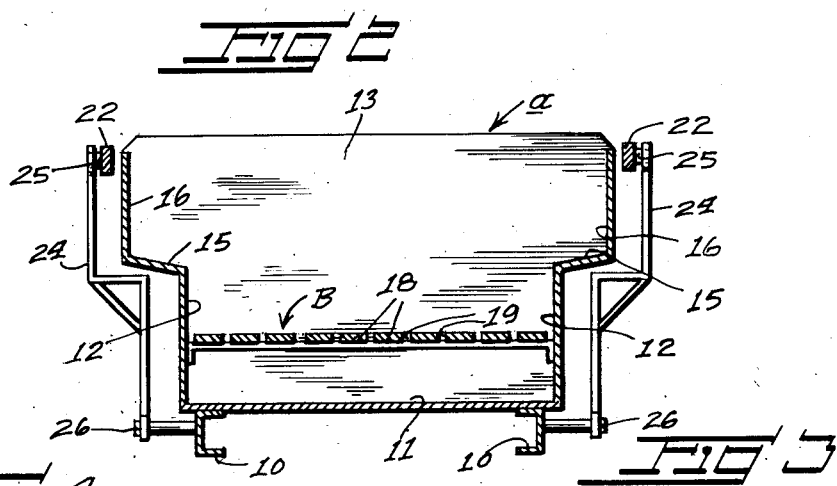
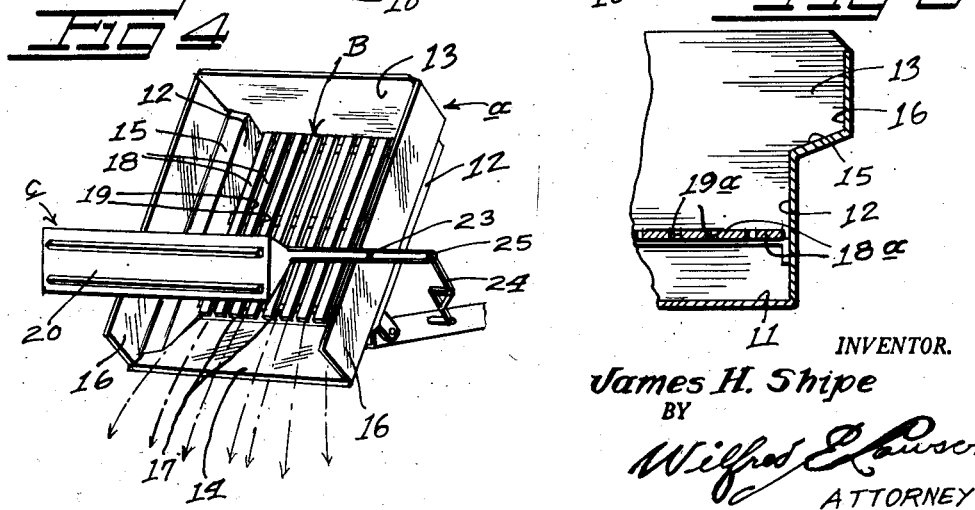
INVENTOR.
James H. Shipe
BY
Wilfred E. Jensen
ATTORNEY Patented Oct. 28, 1952

2,615,753

UNITED STATES PATENT OFFICE 2,615,753

DUMP BODY STRUCTURE

James H. Shipe, Winter Haven, Fla.

Application November 18, 1947, Serial No. 786,590

3 Claims. (Cl. 298—17)

My invention relates to dumping vehicles such as trucks, trailers and the like, the body of which is adapted to be arranged in rearwardly slanting position to unload or dump its load, and the main object of my invention is to provide a dumping vehicle of the character indicated especially adapted to transport materials, which are saturated with liquid without permitting the liquid to overflow or spill from said vehicle.

Another object of my invention is to provide a dumping vehicle of the character indicated above and equipped with a perforated false bottom to enable the liquid to collect in the space between said false bottom and the real bottom and to serve the purpose of cleaning the outlet end of the real bottom as well as the false bottom, when the contents of the vehicle are unloaded by arranging the body of the vehicle in slanting dumping position.

Other objects of my invention may appear in the following specification describing my invention with reference to the accompanying drawing illustrating a preferred embodiment of my invention. It is, however, to be understood, that my invention is not to be limited or restricted to the exact construction and combination of parts described in the specification and shown in the drawing, but that such changes and modifications can be made, which fall within the scope of the claims appended hereto.

In the several figures of the drawing similar parts are designated by similar reference characters and Figure 1 is a fragmentary vertical sectional view taken lengthwise through a vehicle constructed in accordance with an embodiment of the invention;

Figure 2 is a sectional view taken substantially on the line 2—2 of Figure 1;

Figure 3 is a fragmentary sectional view illustrating a further embodiment; and

Figure 4 is a view in perspective of the vehicle as herein comprised with the body in a dumping position.

The dumping vehicle forming the subject matter of my invention may be an automotive vehicle, a trailer or the like having a bed or chassis 10 supporting a dumping body $a$, tiltable by means of a dumping mechanism of any preferred conventional construction. Since this mechanism is not a part of the present invention, it is neither described nor illustrated in detail.

The body $a$ of the dumping vehicle according to my invention has a lower portion consisting of a flat bottom 11, from which longitudinal side walls 12 extend vertically upward at right angles. The front ends of the two side walls 12 are connected with each other by a vertical front wall 13, and the rear ends of said side walls are connected by a rearwardly and upwardly slanting rear wall 14. The side walls 12 have on their upper edges outwardly and upwardly slanting portions 15, on the upper edges of which vertically upward extending side portions 16 are formed or secured. The front wall 13 is as high as or even a little higher than the entire side wall construction, and the rear wall 14 extends from the bottom 11 to the level of the upper edges of the upwardly slanting side wall portions 15. All these members are connected with each other to form a leak-proof body.

At a distance above the bottom 11 of the body $a$, a false bottom B is arranged and removably secured to the side walls 12. The false bottom B extends laterally from side wall to side wall and longitudinally from the front wall to a vertical plane located at a distance in front of the slanting rear wall 14, so that a transverse opening 17 is formed between the rear end of the false bottom B and the slanting rear wall 14. The false bottom B may be constructed of longitudinal bars 18 arranged parallel to and at equal distances from each other, so that longitudinal slots 19 are formed between said bars, or the false bottom may consist of a plate 18a provided with longitudinal slots 19a. Between the bottom 11 and the false bottom B, a space is formed preferably equal to 15% to 20% of the cubic capacity of the entire body $a$.

To increase the capacity of body $a$, a swinging back board $c$ is provided, consisting of a transverse plate 20 adapted to fit snugly over the rear end of the body $a$ above the upper edge of the slanting rear wall 14. On both lateral end edges of the transverse plate 20, a triangular bracket plate 21 is secured, which extends forwardly from said transverse plate. On each bracket plate, a light channel iron 22 is secured adjacent the upper edge of said bracket plate and extends forwardly from said bracket plate. Intermediate its ends and forwardly of the pivot of the dumping body $a$, each channel iron lever 22 is pivotally secured to the adjacent side wall portion 16 as at 23 and an actuating lever 24 is pivotally connected with the forward end of each channel iron lever, as at 25 and extends downwardly therefrom, where it is pivotally mounted on the chassis 10 as at 26.

The above described dumping vehicle is especially adapted for the transportation of peelings of citrus fruit and other materials containing a high percentage of water or other liquids. When the peelings are loaded into the body $a$ of the vehicle, the solid portion of the load is supported by the false bottom B, permitting the liquid portion of the load to enter the space between the false bottom B and the flat body bottom 11 through the slots 19 or 19a in the false bottom, so that overflow or splashing of the liquid over the walls of the body is prevented. When the forward end of the body $a$ is lifted to arrange it in dumping or unloading position, the slanting rear wall 14 will be arranged in a downward slanting position, so that the liquid in the lower space of the body flows out of said body, and the peelings are dumped out. The liquid flowing out of the body, will pass through the longitudinal slots 19 or 19a in the false bottom B and through the transverse opening 17 at the end of said false bottom, so that said liquid rinses and cleans said slots and said opening and washes any solids which may adhere to the bottoms or walls of the body, out of said body.

When the body $a$ is being pivoted into dumping position, the pivot points 23 between the channel levers 22 and the body $a$ are raised relative to the pivot connections 25 between the channel levers 22 and the actuating levers 24, causing the rear ends of the levers 22 and the transverse plate 20 secured thereto, to be pivoted upwardly away from the slanting rear wall 14, permitting the load to slide over said rear wall.

I claim:

1. In a dumping vehicle, the combination with a chassis, and a body supported on said chassis and mounted for pivotal movement about a horizontal axis, said body embodying a bottom wall, a pair of spaced, parallel side walls projecting from said bottom wall and secured thereto, a front wall extended between said side walls and secured thereto and to said bottom wall, an upwardly and rearwardly inclined rear wall extending from said bottom wall and secured to said side walls, said rear wall having its rear end edge in a plane a substantial distance below the top edges of the side walls providing a rear material discharge space, of a false bottom arranged in spaced parallel relation above said bottom wall and releasably mounted in said body, said false bottom having one end contiguous to said front wall and its other end terminating at a distance from and above said inclined rear wall to define a transverse opening for the egress therethrough of liquid.

2. In a dumping vehicle, the combination with a chassis, and a body supported on said chassis and mounted for pivotal movement about a horizontal axis, said body embodying a bottom wall, a pair of spaced, parallel side walls projecting from said bottom wall and secured thereto, a front wall extended between said side walls and secured thereto and to said bottom wall, an inclined rear wall extending from said bottom wall and secured to said side walls, of a false bottom arranged in spaced parallel relation above said bottom wall and releasably mounted in said body, said false bottom having one end contiguous to said front wall and its other end terminating at a distance from said inclined rear wall to define a transverse opening for the egress therethrough of liquid, said false bottom comprising a plurality of bars arranged in spaced, parallel relation with respect to each other to define longitudinal slots therebetween.

3. In a dumping vehicle, the combination with a chassis, and a body supported on said chassis and mounted for pivotal movement about a horizontal axis, said body embodying a bottom wall, a pair of spaced, parallel side walls projecting from said bottom wall and secured thereto, a front wall extended between said side walls and secured thereto and to said bottom wall, an inclined rear wall extending from said bottom wall and secured to said side walls, of a false bottom arranged in spaced parallel relation with and above said bottom wall, means removably supporting the false bottom in said body, said false bottom having one end contiguous to said front wall and its other end terminating at a distance from said inclined rear wall to define a transverse opening for the egress therethrough of liquid, said false bottom having a plurality of spaced parallel slots extending longitudinally of the body.

JAMES H. SHIPE.

REFERENCES CITED

The following references are of record in the file of this patent:

UNITED STATES PATENTS

| Number | Name | Date |
|---|---|---|
| 532,289 | Sagle et al. | Jan. 8, 1895 |
| 545,264 | Booth et al. | Aug. 27, 1895 |
| 771,936 | Rigenberick | Oct. 11, 1904 |
| 1,750,677 | Marx | Mar. 18, 1930 |

FOREIGN PATENTS

| Number | Country | Date |
|---|---|---|
| 21,988 | Great Britain | Nov. 19, 1895 |
| 456,158 | Great Britain | of 1936 |